Dec. 27, 1938.  A. P. ARMINGTON  2,141,165
RUNNING GEAR
Filed Feb. 26, 1937  3 Sheets-Sheet 1

INVENTOR
ARTHUR P. ARMINGTON.
BY Brockett, Hyde, Higley + Meyer
ATTORNEYS.

INVENTOR
ARTHUR P. ARMINGTON.
BY
Brockett, Hyde, Higley + Meyer.
ATTORNEYS.

Patented Dec. 27, 1938

2,141,165

UNITED STATES PATENT OFFICE 2,141,165

RUNNING GEAR

Arthur P. Armington, Willoughby, Ohio; Katherine Stewart Armington, executrix of Arthur P. Armington, deceased, assignor to The Euclid Road Machinery Company, Euclid, Ohio, a corporation of Ohio Application February 26, 1937, Serial No. 127,975

5 Claims. (Cl. 267—63)

This invention relates to running gear for wheeled vehicles and has for its general object the provision of simple, inexpensive, yet highly efficient means suitable for mounting a vehicle body upon its axle, such means employing resilient non-metallic elements of the type disclosed in my copending application, Serial No. 13,807, filed March 30, 1935, so that the usual metal springs with their possibility of breakage and lubrication requirements are eliminated.

The invention particularly contemplates a heavy body which may laterally overhang the wheels, and provides a novel arrangement of the parts of such structure whereby the resilient elements are disposed with their wall parts extending divergently upwardly so as to distribute their transmitted forces relative to the body while correspondingly concentrating such forces relative to the axle, at two locations widely spaced upon the axle while strengthening the axle against bending stresses. Such arrangement includes advantages of strength and compactness as will appear, and may employ simple columns located in widely spaced locations upon the axle, each closely adjacent one of the wheels, rising from the axle and carrying at its upper end one of the resilient elements, the latter having a portion adjacent or overhanging its near wheel.

As further objects, the invention may be considered as embracing a load-carrying structure disposed over the axle and generally in its plane, for supporting the body weight thereon and including a pair of resilient elements through which the weight is transmitted, and a positioning structure for the load-carrying structure secured thereto and extending therefrom longitudinally of the vehicle to connection with the vehicle frame, whereby the load-carrying structure is maintained in upright position over the axle, without confinement, however, of the resilient elements.

Figure 1:
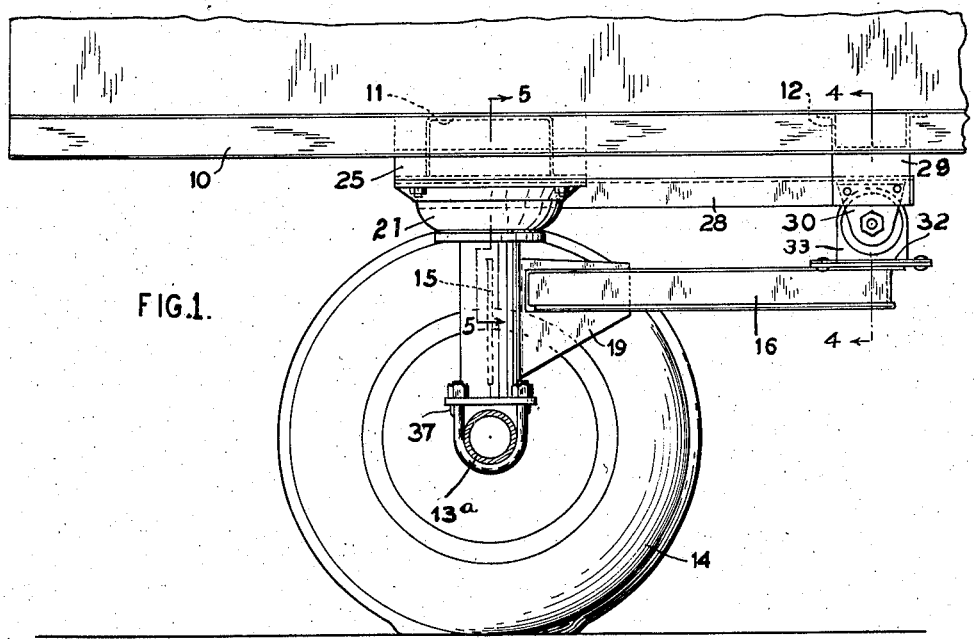
Figure 2:
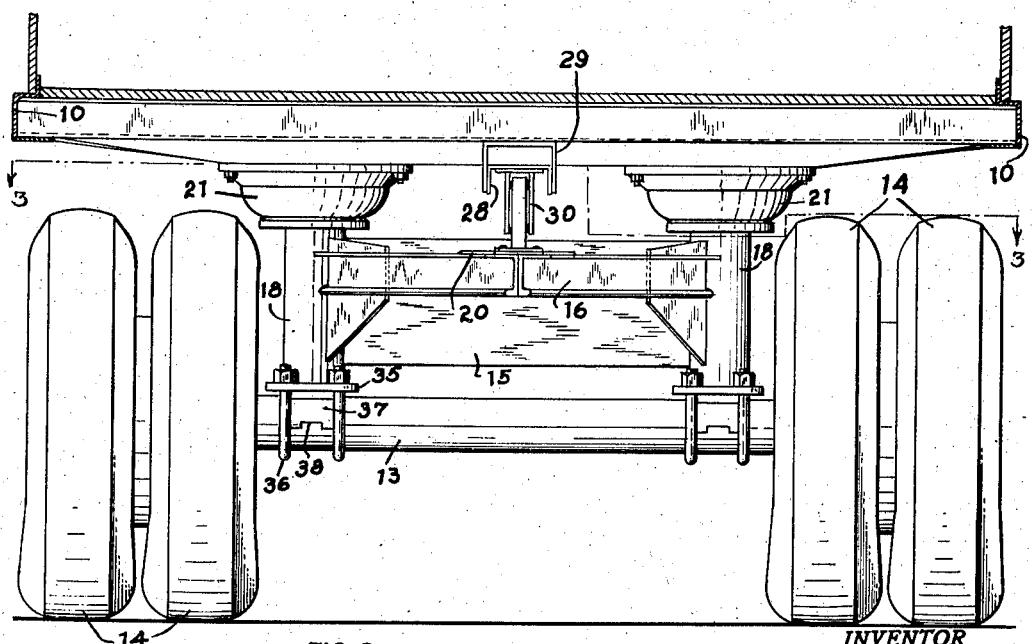
Figure 3:
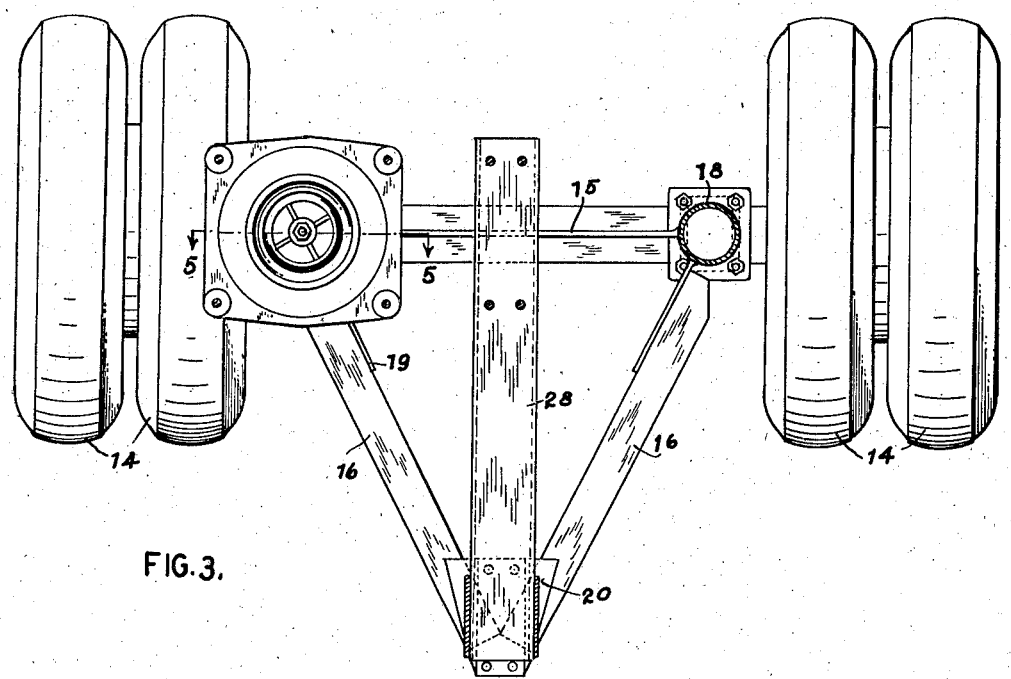
Figures 4, 5:
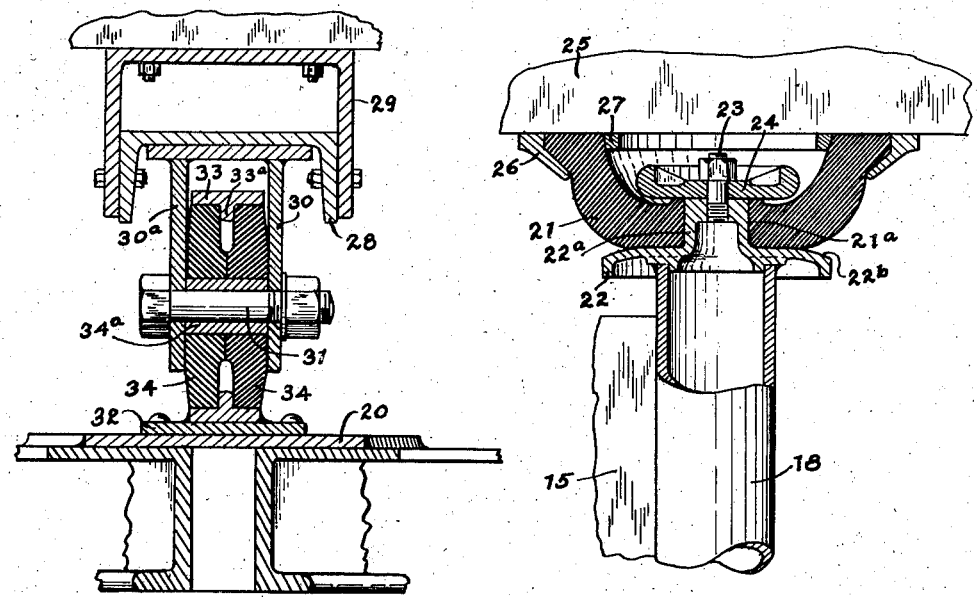
Figure 6:
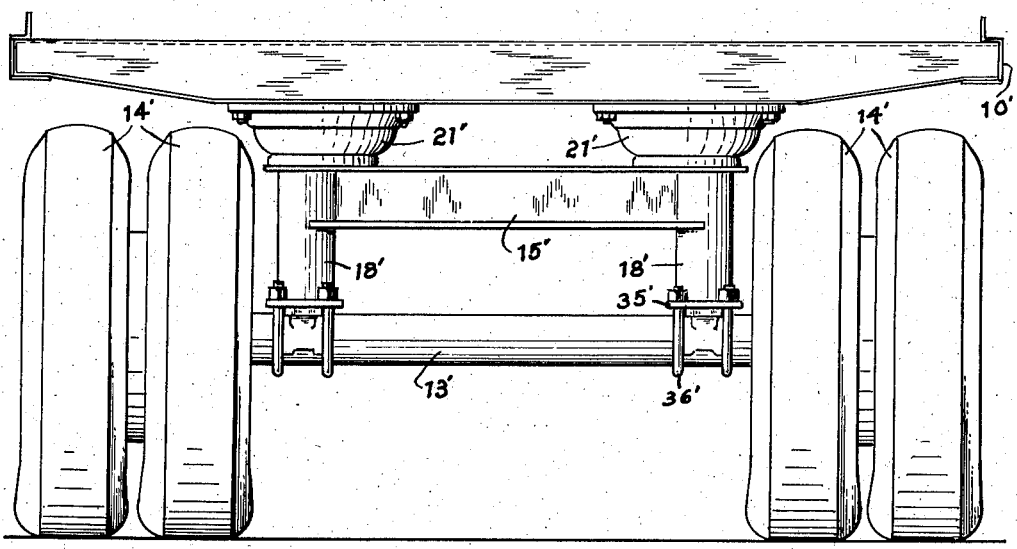
Figure 7:
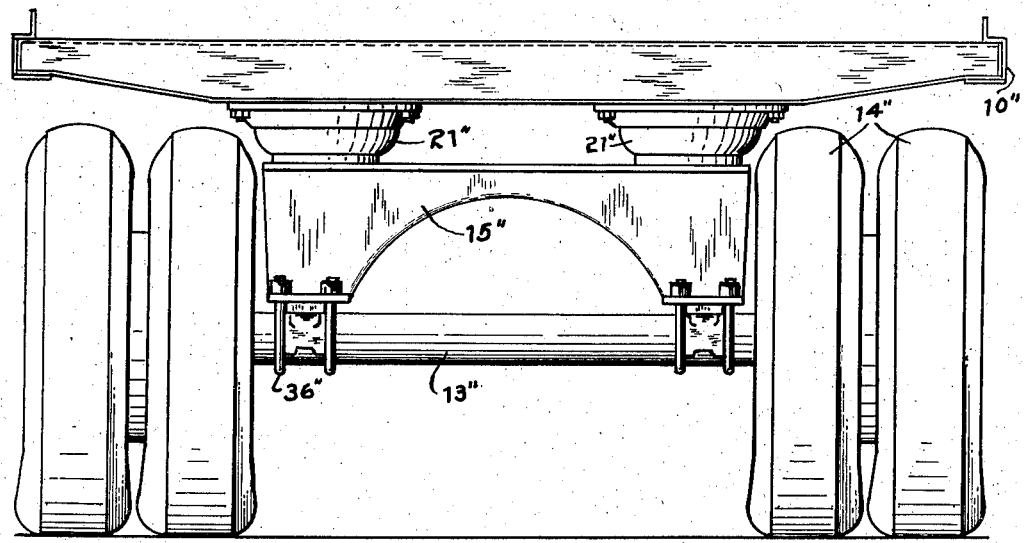

The exact nature of this invention together with further objects and advantages thereof will be apparent from the following description taken in connection with the accompanying drawings, in which Fig. 1 is a side elevation showing my improved axle locating structure in position on a wheeled vehicle, the nearer wheels being cut away to more clearly disclose the structure; Fig. 2 is an end elevation of the structure of Fig. 1 looking toward the rear of the vehicle; Fig. 3 is a plan view partly in section taken along the line 3—3 of Fig. 2; Fig. 4 is an enlarged detail sectional view taken along the line 4—4 of Fig. 1; while Fig. 5 is an enlarged detail sectional view taken along the line 5—5 of Fig. 3; Figs. 6 and 7 being views in rear elevation of two modified structures for support of the body upon the axle.

While certain features of my invention are applicable to any vehicle as set forth in the claims, I have chosen to illustrate the same as applied to a highway vehicle and particularly to a non-driven axle of a trailer type of highway vehicle running on pneumatic tires. In the present embodiment the vehicle is disclosed as having a body which may include a suitable frame comprising for instance longitudinal members 10 and suitable cross frame members 11 and 12. Beneath this frame is the axle means 13 with which are associated the wheels 14 which, as illustrated, are provided with dual pneumatic tires. The axle means illustrated comprises a non-rotatable member 13a at the ends of which the wheels rotate.

As illustrated in Figs. 1 to 5 inclusive, my improved structure for uniting the body and axle means comprises a substantially rigid triangular framework having a web member 15 extending transversely between a pair of column members 18, and side members 16 forwardly convergent thereof. Column members 18, thus located at the two rear corners of this framework, are preferably tubular, interconnected by the member 15 as by welding. The sides 16 are preferably standard structural members, such as the bulb angles shown, which are rigidly secured to each other and to the members 18. In the form shown the bulb angles 16 are welded to gusset plates 19 which in turn are welded to the tubes 18. At their other ends the bulb angles are secured together by welding to a common plate 20. The members 16 form arm means extending forwardly from the angle 13 and connected at its forward end to the body frame of the vehicle to transmit pull from the frame to the axle means 13. This arm means thus serves to locate the axle means longitudinally of the vehicle.

The substantially rigid triangular framework including members 15, 16, and connecting parts, is secured to the axle housing 13a in a manner to prevent any relative movement between the connected parts. This connection comprises a plate 35 secured to the lower end of each of the column members 18, U-bolts 36 passing about the axle housing and secured to the plate 35, and saddle members 37 interposed between the plates 35 and the axle housing 13a as best seen in Figs. 1 and 2. These saddle members have flat upper surfaces engaging the under surfaces of their plates 35 and semi-cylindrical lower surfaces embracing the axle housing 13a. Shoulders 38 are provided on the housing 13a, as by welding, against which the lower edges of the saddles 37 engage so as to prevent relative rotation of the saddles with respect to the housing 13a. The shoulders 38 are also arranged to prevent movement of the triangular framework longitudinally of the axle.

I provide a novel connection between the members 18 and the frame of the vehicle which produces novel results when applied to a highway vehicle such as that illustrated. These results have to do particularly with prevention of skidding. The novel connection illustrated comprises a pair of resilient nonmetallic elements 21, one on each side of the vehicle above the axle and connected with the axle and with the vehicle frame so as to provide vertical springing of the vehicle body while at the same time permitting relative movement in all horizontal directions, which movement is resisted by the elements 21 in a manner about to be described. The elements 21 are alike so that one only need be described.

As best seen in Fig. 5, a cup-like rubber element 21 having upwardly divergent wall parts, has a centrally located opening 21a which fits over a boss 22a of the circular member 22 which in turn fits over the top of the column member 18 and is rigidly secured thereto as by the welding shown. Through an opening in the boss 22a there is passed a bolt 23 which secures a clamping disk 24 to the member 22 and holds the central portion of the cup 21 in place. The periphery of the cup member is secured to the frame 25 of the vehicle by an outer ring 26 which is bolted or otherwise rigidly fastened to the frame 25 and embraces the outer surface of the element 21. A ring 27 within the element prevents collapse thereof and holds the mouth edge of the cup within the ring 26. The upper surface 22b of the member 22 is given a particular form to assist the cup 21 in supporting the lower part of the vehicle body but the details of the cup 21 and the arrangement of the surface 22b are more fully described and claimed in my copending application Serial No. 126,759, filed February 20, 1937.

I provide a novel connection between the forward end of arm members 16 and the frame of the vehicle. To this end I provide a pivotal connection between the arm means and the frame which connection permits yieldably limited movement of the connected parts longitudinally and transversely of the vehicle, as well as vertically, and also combinations of these movements. To this end I provide two members, one connected with the arm means and one connected with the frame with a pivot pin carried by one of the members and a resilient element embracing the pin and carried by the other of the members. In the form shown a channel member 28 extending longitudinally of the vehicle is bolted or riveted or otherwise rigidly secured to the frame members 11 and 12. At the forward end of this channel member a spacer member 29 is provided to secure the channel member 28 to the frame member 12. Rigidly secured to the forward end of the channel member 28 is a bracket 30 which carries the pivot pin 31. Secured to the plate 20 is a bracket 32 supporting a substantially cylindrical band 33 which embraces a pair of rubber blocks 34. Centrally of the rubber blocks is a grommet 34a which embraces the pin 31. It will be noted that the rubber blocks are substantially keyed to the band 33 by the annular rib 33a which enters a groove between the rubber blocks. The band 33 is of less width than the space between the sides 30a of the bracket 30 so as to permit a tilting of the pivot connection to accommodate axle movement out of position parallel to the frame due to irregularity of the highway or other causes.

If a braking effect is applied to the wheels 14 as by a brake drum, or if the wheels 14 strike an object in the road, or if a sudden pull is exerted on the vehicle frame, there is a tendency for the arm means 16—17 to move downwardly and this is resisted by the resilient blocks 34. At the same time the pivot pin connection accommodates itself to the vertical springing action of the cups 21 and accommodates itself to side sway of the vehicle body on the cups 21 as previously described and also accommodates itself to tilting action of the axle 13. In all of these relative movements about the resilient pivotal connection the tendency of the rubber blocks 34 is always to restore the parts to unstressed position so that any of the relative movements between the frame and the axle means are thus resisted and tend to be corrected by the action of the rubber blocks 34.

It will be observed that the weight of the body in elevated position is carried by structure extending laterally with the axle means and secured thereto adjacent the wheels and including rigid means generally of arched form comprising as shown Fig. 2, the columns 18 interconnected by the web 15, the laterally spaced pair of resilient elements 21 being supported by this rigid means and in supporting relation with the body. This load-carrying structure will be observed as positively maintained in upright position over the axle, while permitting free action of the resilient elements by positioning structure comprising principally the members 16 rigidly connected at laterally spaced locations to the rigid load-carrying structure and extending convergently therefrom to longitudinally removed connection with the vehicle body.

With reference now to the modification of Fig. 6, the arrangement is generally as before except that the web member 15' interconnecting the column members 18' to form the rigid load-carrying structure, is of less width, heavier construction, and clears the axle means 13' at a higher elevation. Also, the laterally spaced resilient elements 21' are eccentric of their columns 18', each extending partially over the web member 15' for partial support therefrom.

With reference now to the modification of Fig. 7, the rigid load-carrying structure 15" comprises essentially a single I-beam, the central lower portion of which is cut away so that the member has arch characteristics when viewed in elevation as illustrated. It is connected to the axle means 13" adjacent the wheels as by U-bolts arranged in its lower flanges, and the resilient elements 21" are supported in laterally spaced relation upon its upper flange.

The positioning structure in both these modifications is rigidly connected to the illustrated rigid load-carrying structure generally as before as by welding, as will be appreciated by anyone familiar with the art.

What I claim is:

1. In a vehicle having a pair of wheels, axle means therefor, and body means, means mounting said body means in elevated position upon said axle means and comprising rigid load-carrying structure generally of arched form extending laterally with said axle means, disposed thereabove and secured thereto adjacent said wheels, positioning structure for said load-carrying structure, and a pair of non-metallic resilient elements of upwardly divergent form mounted upon the top of said load-carrying structure adjacent its lateral extremities, each element with its larger end in supporting relation with said body means, and each element having side wall parts stressed in compression by said relation.

2. In a vehicle having a pair of wheels, axle means therefor, and body means, means mounting said body means in elevated position upon said axle means and comprising rigid load-carrying structure generally of arched form extending laterally with said axle means, disposed thereabove and secured thereto adjacent said wheels, positioning structure for said load-carrying structure, and a pair of non-metallic resilient elements of upwardly divergent form mounted upon the top of said load-carrying structure and in supporting relation with said body means, each said element being located adjacent one extremity of said top, and overhanging the corresponding wheel.

3. In a vehicle having a pair of wheels, axle means therefor, and body means, means mounting said body means in elevated position upon said axle means and comprising a pair of column members each disposed upon said axle means adjacent one of said wheels and extending upwardly approximately to the top of its wheel, brace means laterally extending above said axle means between said column members for lateral support of the latter, V-shaped positioning means arranged to provide connection between said column members and said body at a location longitudinally removed from said column members, and a pair of non-metallic resilient elements each arranged in supported relation with said brace means and one of said column members and in supporting relation with said body means.

4. In a vehicle having a pair of wheels, axle means therefor, and body means, means mounting said body means in elevated position upon said axle means and comprising a pair of column members each disposed upon said axle means adjacent one of said wheels and extending upwardly approximately to the top of its wheel, brace means laterally extending above said axle means between said column members for lateral support of the latter, V-shaped positioning means arranged to provide connection between said column members and said body at a location longitudinally removed from said column members, and a pair of non-metallic resilient elements of upwardly divergent form, each arranged with its larger end in supporting relation with said body means, and its smaller in supported relation with one of said column members and a portion of said brace means.

5. In a vehicle having a pair of wheels, axle means therefor, and body means, means mounting said body means in elevated position upon said axle means and comprising a pair of column members each disposed upon said axle means adjacent one of said wheels and extending upwardly approximately to the top of its wheel, brace means laterally extending above said axle means between said column members for lateral support of the latter, V-shaped positioning means arranged to provide connection between said column members and said body at a location longitudinally removed from said column members, and a pair of non-metallic resilient elements of upwardly divergent form arranged in supporting relation with said body means, each in supported relation with said brace means and one of said column members, and overhanging the near wheel.

ARTHUR P. ARMINGTON.